United States Patent
Kaspa

(10) Patent No.: US 12,332,884 B2
(45) Date of Patent: Jun. 17, 2025

(54) ANALYSIS OF TEMPORARY QUERIES IN A RELATIONAL STATEMENT

(71) Applicant: Capital One Services, LLC, McLean, VA (US)

(72) Inventor: Chanakya Kaspa, Mckinney, TX (US)

(73) Assignee: Capital One Servicees, LLC, McLean, VA (US)

( * ) Notice: Subject to any disclaimer, the term of this patent is extended or adjusted under 35 U.S.C. 154(b) by 44 days.

(21) Appl. No.: 18/356,440

(22) Filed: Jul. 21, 2023

(65) Prior Publication Data

US 2025/0028717 A1    Jan. 23, 2025

(51) Int. Cl.
  *G06F 16/245* (2019.01)
  *G06F 11/34* (2006.01)
  *G06F 16/2452* (2019.01)
  *G06F 16/2453* (2019.01)
  *G06F 16/2455* (2019.01)

(52) U.S. Cl.
  CPC .... *G06F 16/24534* (2019.01); *G06F 11/3419* (2013.01); *G06F 16/24524* (2019.01); *G06F 16/24552* (2019.01)

(58) Field of Classification Search
  None
  See application file for complete search history.

(56) References Cited

U.S. PATENT DOCUMENTS

| | | | | |
|---|---|---|---|---|
| 9,589,030 | B1* | 3/2017 | El-Helw | G06F 16/2471 |
| 2006/0136407 | A1* | 6/2006 | Dettinger | G06F 16/24526 |
| 2007/0043697 | A1* | 2/2007 | Driesch, Jr. | G06F 16/24545 |
| 2012/0005189 | A1* | 1/2012 | Yu | G06F 16/24542 |
| | | | | 707/718 |
| 2015/0149441 | A1* | 5/2015 | Nica | G06F 16/24542 |
| | | | | 707/719 |
| 2020/0285643 | A1* | 9/2020 | Kadiam | G06F 16/9024 |
| 2024/0256540 | A1* | 8/2024 | Cruanes | G06F 16/24532 |

* cited by examiner

*Primary Examiner* — Son T Hoang
(74) *Attorney, Agent, or Firm* — Harrity & Harrity, LLP

(57) ABSTRACT

In some implementations, a device may obtain the relational statement associated with a query of a database. The device may parse the relational statement to identify one or more temporary queries included in the relational statement. The device may modify the relational statement to include segment indicators for respective segments of the relational statement associated with respective temporary queries from the one or more temporary queries. The device may execute the relational statement. The device may determine, based on executing the relational statement and based on the segment indicators, one or more execution performance parameters for each segment included in the relational statement, wherein the one or more execution performance parameters indicate performance levels of the one or more temporary queries. The device may store the one or more execution performance parameters for each segment.

19 Claims, 6 Drawing Sheets

ANALYSIS OF TEMPORARY QUERIES IN A RELATIONAL STATEMENT

BACKGROUND

Structured query language (SQL) (sometimes referred to as "sequel") is a domain-specific language used in programming and designed for managing data held in a relational databases and/or for stream processing in a relational data stream, among other examples. SQL may be useful in handling structured data, such as data incorporating relations among entities and variables. SQL may enable multiple records to be accessed via a single command without specifying how to reach a record (e.g., with or without an index).

SUMMARY

Some implementations described herein relate to a system for analysis of temporary queries in a relational statement. The system may include one or more memories and one or more processors communicatively coupled to the one or more memories. The one or more processors may be configured to obtain a structured query language (SQL) statement associated with one or more operations associated with a database. The one or more processors may be configured to identify, based on obtaining the SQL statement, one or more common table expression (CTE) queries included in the SQL statement, wherein the one or more CTE queries are associated with temporary query results that exist for a duration of an execution of the SQL statement. The one or more processors may be configured to segment the SQL statement into one or more segments, wherein the one or more segments are associated with respective CTE queries from the one or more CTE queries. The one or more processors may be configured to execute the SQL statement to perform the one or more CTE queries. The one or more processors may be configured to determine, based on executing the SQL statement, one or more performance parameters associated with executing the respective CTE queries from the one or more CTE queries. The one or more processors may be configured to generate, based on determining the one or more performance parameters, a CTE database indicating the one or more performance parameters. The one or more processors may be configured to provide, to a device, the CTE database.

Some implementations described herein relate to a method of analysis of temporary queries in a relational statement. The method may include obtaining, by a device, the relational statement associated with a query of a database. The method may include parsing, by the device, the relational statement to identify one or more temporary queries included in the relational statement. The method may include modifying, by the device, the relational statement to include segment indicators for respective segments of the relational statement associated with respective temporary queries from the one or more temporary queries. The method may include executing, by the device, the relational statement. The method may include determining, by the device and based on executing the relational statement and based on the segment indicators, one or more execution performance parameters for each segment included in the relational statement, wherein the one or more execution performance parameters indicate performance levels of the one or more temporary queries. The method may include storing, by the device, the one or more execution performance parameters for each segment.

Some implementations described herein relate to a non-transitory computer-readable medium that stores a set of instructions. The set of instructions, when executed by one or more processors of a device, may cause the device to obtain an SQL statement associated with a query of a database. The set of instructions, when executed by one or more processors of the device, may cause the device to identify, based on obtaining the SQL statement, one or more CTE queries included in the SQL statement. The set of instructions, when executed by one or more processors of the device, may cause the device to partition the SQL statement into one or more segments, wherein the one or more segments are associated with respective CTE queries from the one or more CTE queries. The set of instructions, when executed by one or more processors of the device, may cause the device to execute the SQL statement to perform the one or more CTE queries. The set of instructions, when executed by one or more processors of the device, may cause the device to determine, based on executing the SQL statement, one or more performance parameters associated with executing the respective CTE queries from the one or more CTE queries. The set of instructions, when executed by one or more processors of the device, may cause the device to generate, based on determining the one or more performance parameters, a CTE database indicating the one or more performance parameters.

DETAILED DESCRIPTION

Figure 1A:
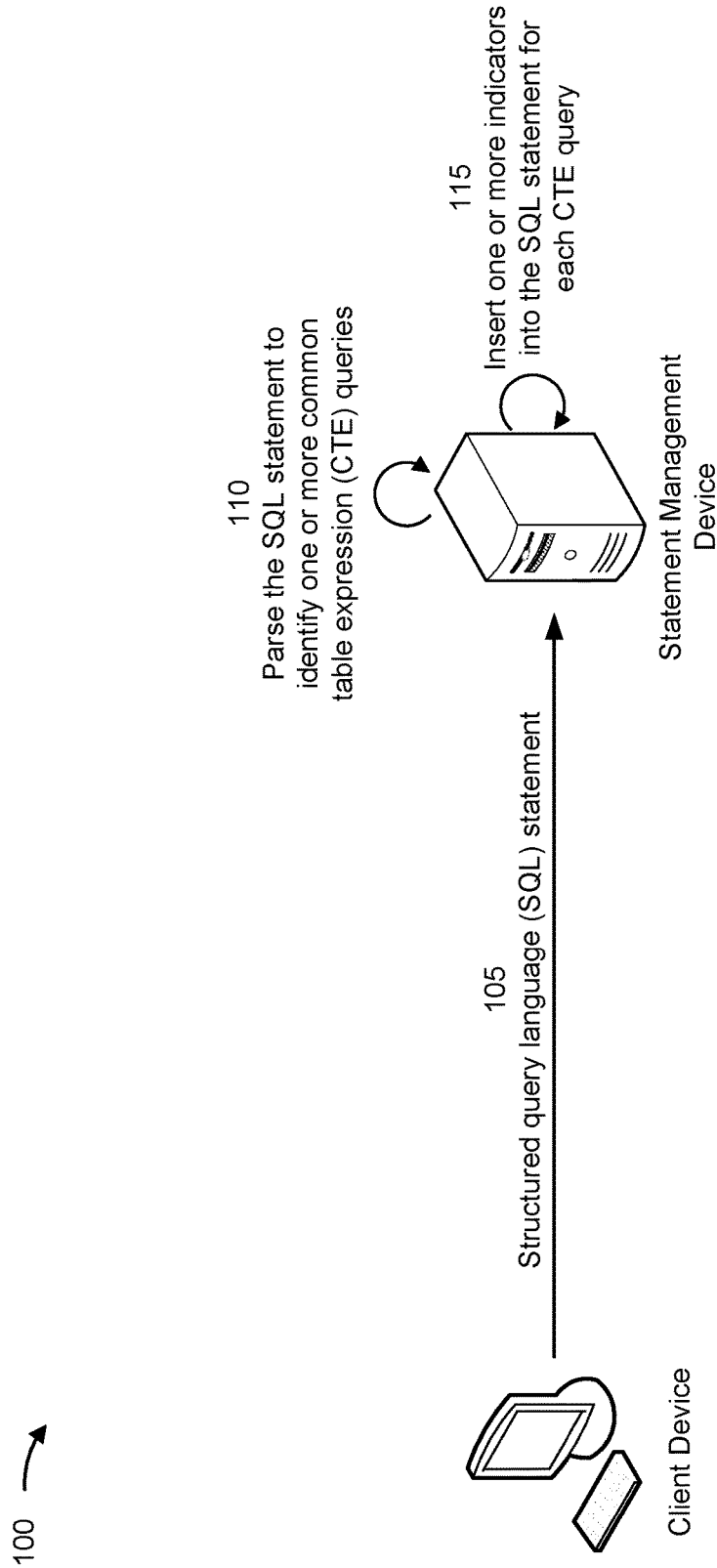
FIGS. 1A-1C are diagrams of an example associated with analysis of temporary queries in a relational statement, in accordance with some embodiments of the present disclosure.

The following detailed description of example implementations refers to the accompanying drawings. The same reference numbers in different drawings may identify the same or similar elements.

A relational model may organize data into one or more tables (or relations) of columns and rows, with a unique key identifying each row. Rows may be referred to as records and/or tuples, among other examples. Columns may be referred to as attributes. A relational database may be a database that is based on the relational model. A "relational statement" may refer to an instruction to perform an operation on a relational database or a relational database management system. In some cases, a relational statement may be performed using the structured query language (SQL) (e.g., which may be referred to as an "SQL statement"). An SQL statement may also be referred to as an SQL command, an SQL query, SQL instructions, and/or an SQL file, among other examples. SQL is a programming language associated with creating, storing, updating, and/or retrieving, among other examples, data in relational databases (e.g., an SQL statement may include one or more SQL commands or instructions for performing one or more operations associated with a relational database). For example, SQL statements can be used to execute queries against a database, retrieve data from a database, insert records into a database, update records in a database, delete records from a database, create new databases (or new tables in a database), create stored procedure or views associated with a database, and/or set permissions or security information for a database, among other examples.

In some examples, a relational statement (e.g., an SQL statement) may include one or more temporary queries. A "temporary query" may refer to a query that produces results that exist temporarily (e.g., for a duration of the execution of the SQL statement). For example, the results of a temporary query may be deleted after the SQL statement is executed. Other portions of the relational statement may refer to and/or rely on the results of the temporary query when the relational statement is executed. Temporary query may be used interchangeably with temporary statement herein. An example of a temporary query is a common table expression (CTE) query (or CTE statement). A CTE query may produce a temporary named result set that can be referenced within other commands or statements of an SQL statement. For example, a CTE query may result in a temporary (or virtual) table (sometimes referred to as a CTE or a CTE table) that is created during execution of an SQL statement, where the temporary table is referenced and/or used by other portions of the SQL statement. The temporary table may be deleted after the SQL statement is executed. In other words, the results of a CTE query may not be stored permanently in a database schema of a relational database. CTEs may simplify an SQL statement. For example, a CTE query may transform data in a source database into a format that can be more easily referenced and/or used by other portions of an SQL statement.

An SQL statement may be executed by a device to cause the device to perform one or more operations associated with a relational database. The device may execute the SQL statement in a single pass or a single attempt (sometimes referred to as "one shot" execution). For example, the SQL statement (e.g., in its entirety) may be executed by the device in a single attempt. For example, the SQL statement may be designed to execute once, cause the device to perform the intended operation(s), and then terminate after execution. In some cases, the device may experience one or more performance issues when executing an SQL statement. For example, the device may take a large amount of time to execute the SQL statement, thereby consuming computing resources, processing resources, and/or power resources, among other examples, associated with executing the SQL statement for the large amount of time. As another example, the device may fail to perform an operation intended by the SQL statement, thereby needlessly consuming computing resources, processing resources, and/or power resources, among other examples, associated with executing the SQL statement for which the device fails perform the intended operation.

In some cases, a performance issue associated with executing an SQL statement (e.g., a relational statement) may be caused by one or more temporary queries (e.g., CTE queries) included in the SQL statement. However, because the temporary queries produce temporary results that exist only during the execution of the SQL statement and because the SQL statement is executed in a "one shot" manner (e.g., executing in its entirety in a single pass), it is difficult to analyze the performance of a given temporary query (e.g., a given CTE query). For example, because the results of a CTE query are deleted after the execution of the SQL statement, it is difficult to analyze the performance of the CTE statement. Additionally, because a given SQL statement may include many CTE queries, it is difficult to identify which CTE query included in the SQL statement is causing a performance issue. For example, because the temporary results produced by the CTE statement (e.g., that may be referenced by other portions of the SQL statement) are not available for analysis after the execution of the SQL statement, the device may be unable to identify which CTE queries are causing performance issues and/or identify any particular issues with a given CTE query.

Some implementations described herein enable analysis of temporary queries in a relational statement. For example, one or more CTE queries in an SQL statement may be identified and/or analyzed during execution of the SQL statement. For example, a device may obtain an SQL statement (e.g., that is associated with causing one or more operations associated with a relational database to be performed). The device may identify one or more CTE queries included in the SQL statement. For example, the device may parse the SQL statement for one or more identifiers associated with identifying a start and/or an end of a CTE query.

The device may segment the SQL statement into one or more segments (e.g., where the one or more segments are associated with respective CTE queries from the one or more CTE queries identified in the SQL statement). As an example, the device may include identifiers or markers in an SQL file identifying a starts and/or ends of the respective CTE queries that are included in the SQL statement. The device may execute the SQL statement (e.g., to perform the one or more CTE queries). The device may determine, based on executing the SQL statement, one or more performance parameters associated with executing the respective CTE queries from the one or more CTE queries (e.g., based on analyzing a performance of each segment from the one or more segments).

In some implementations, the device may generate a CTE database indicating the one or more performance parameters. For example, the device may generate a database indicating performance parameters of respective CTE queries included in a given SQL statement. The device may provide the CTE database in association with executing the SQL statement (e.g., to enable a user to identify the performance parameters of respective CTE queries included in a given SQL statement).

In some implementations, the device may perform an action based on the one or more performance parameters. For example, the device may determine, based on the one or more performance parameters, that a CTE query, from the one or more CTE queries, is associated with an execution performance issue. The device may perform an action associated with the CTE query based on determining that the CTE query is associated with the execution performance issue. For example, the device may analyze an SQL syntax of the CTE query. The device may identify, based on analyzing the SQL syntax, one or more SQL statements included in the CTE query that are associated with causing the execution performance issue. In some implementations, the device may provide a recommended update for (or may automatically update) the SQL syntax of the CTE query.

As a result, performance issues for a device associated with executing a SQL statement that are caused by one or more temporary queries (e.g., one or more CTE queries) may be easily mitigated. For example, by including identifiers in the SQL statement (or a file that includes the SQL statement) that identify locations, in the SQL statement, associated with respective temporary queries, the device may be enabled to identify performance parameters for each temporary query (e.g., each CTE query) during the "one shot" execution of the SQL statement. Providing the performance parameters associated with respective temporary queries (e.g., CTE queries) in a relational statement (e.g., an SQL statement) enables the device (and/or a user) to identify and/or modify temporary queries (e.g., CTE queries) that are causing performance issues associated with executing the temporary statement. As a result, the device is enabled to execute an SQL statement that includes temporary queries (e.g., CTE queries) that have been modified to mitigate one or more performance issues, thereby conserving computing resources, processing resources, and/or power resources, among other examples, that would have otherwise been used to execute the SQL statement that results in the one or more performance issues, and/or to identify the temporary queries (e.g., CTE queries) that are causing the one or more performance issues, among other examples.

Figure 1B:
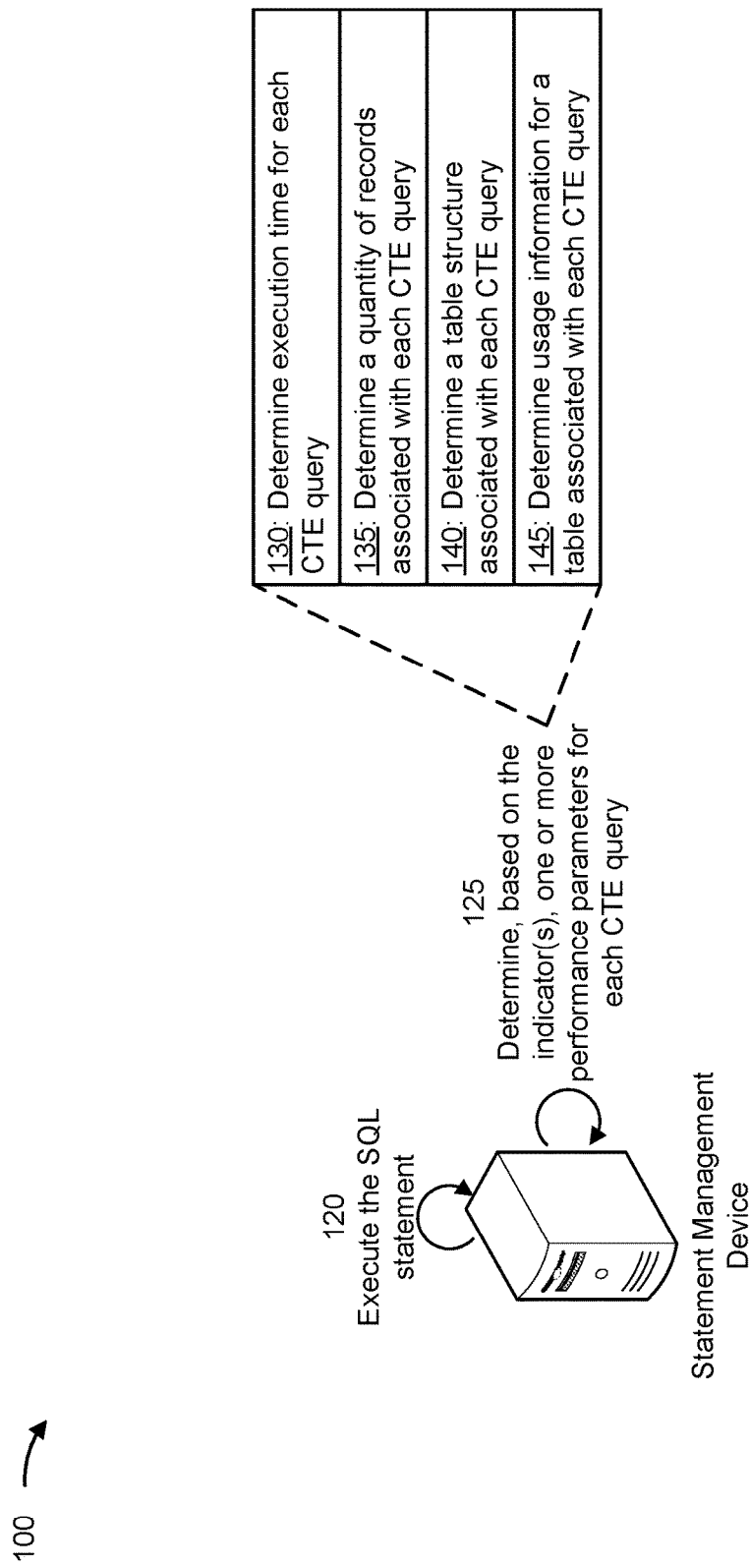
Figure 1C:
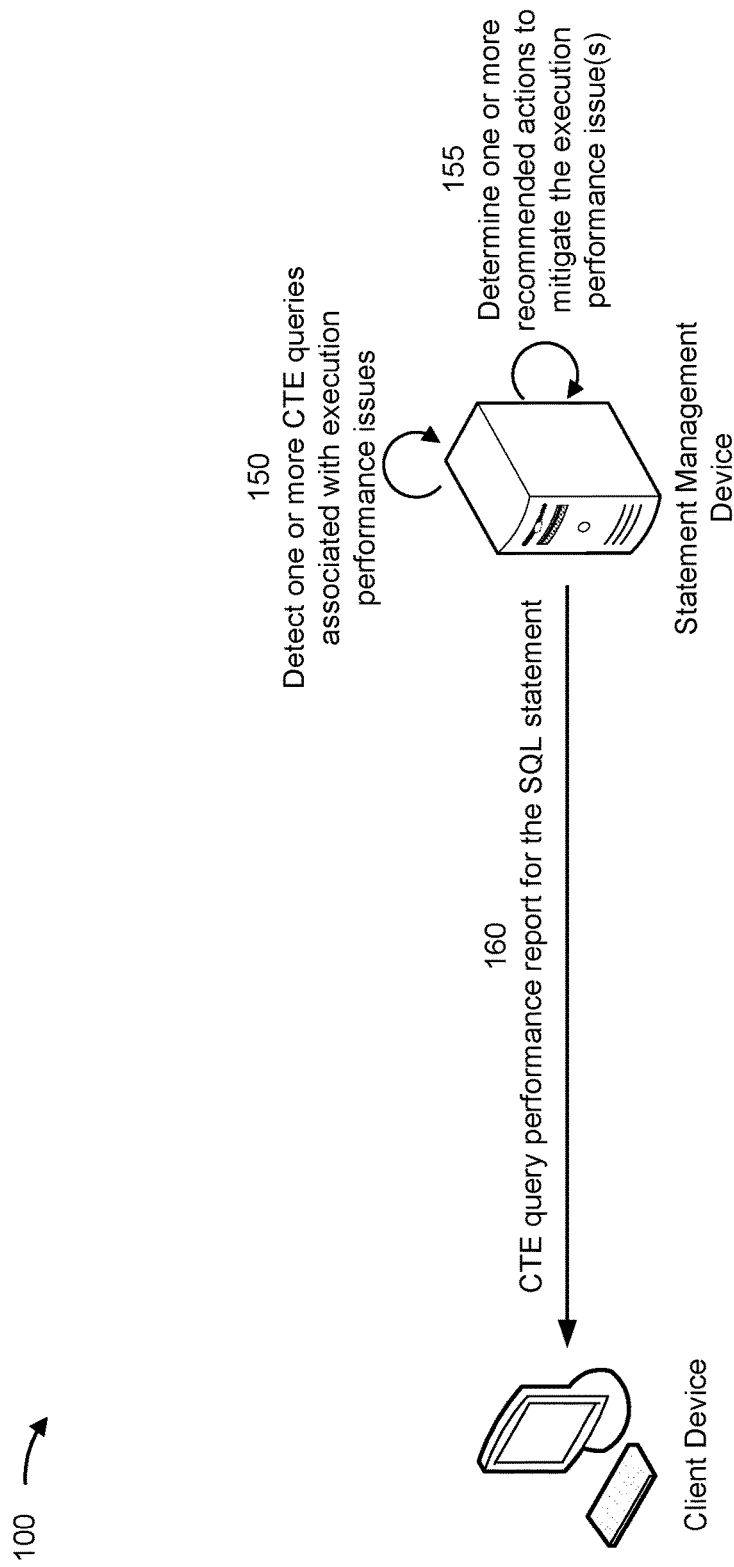

FIGS. 1A-1C are diagrams of an example 100 associated with analysis of temporary queries in a relational statement. As shown in FIGS. 1A-1C, example 100 includes a statement management device and a client device. These devices are described in more detail in connection with FIGS. 2 and 3.

Although some implementations are described herein using SQL as an example relational statement format, the implementations described herein may be similarly applied to any relational statements. Other example formats of relational statements include JAVA persistence query language (JPQL), language integrated query (LINQ), and/or hypertext structured query language (HTSQL), among other examples. Similarly, although some implementations are described herein using CTE as an example temporary query, the implementations described herein may be similarly applied to any temporary queries or temporary statements included in a relational statement (e.g., any statement, command, query, or instruction in a relational statement that produces temporary results that can be referenced or used by other portions of the relational statement).

As shown in FIG. 1A, the client device may provide or transmit, and the statement management device may obtain or receive, an SQL statement (or another relational statement). For example, a user may generate the SQL statement via the client device. As another example, the client device may download or otherwise obtain the SQL statement. In some implementations, the client device may provide, and the statement management device may obtain, the SQL statement in connection with executing the SQL statement. For example, the statement management device may be a device that executes the SQL statement (e.g., to perform one or more operations associated with a relational database). Additionally, or alternatively, the client device may provide, and the statement management device may obtain, the SQL statement in connection with troubleshooting the SQL statement. For example, the statement management device may be associated with identifying one or more performance issues associated with the SQL statement and/or one or more temporary queries (e.g., CTE queries) that are included in the SQL statement.

In some implementations, the statement management device may be a device that is configured to execute SQL statements. In some implementations, the statement management device and the client device may be associated with the same entity (e.g., the same person or the same company). In other implementations, the statement management device and the client device may be associated with different entities. For example, the statement management device may be associated with a third-party service that identifies one or more performance issues associated with the SQL statement and/or one or more temporary queries (e.g., CTE queries) that are included in the SQL statement, as explained in more detail elsewhere herein.

In some implementations, the statement management device may obtain an SQL file (e.g., a file with a .sql extension). The SQL file may include the SQL statement. Additionally, the statement management device may obtain information identifying one or more databases (e.g., one or more databases) associated with the SQL statement. For example, the statement management device may obtain information identifying a location (e.g., a storage location or a location in memory) where the one or more databases are stored and/or can be accessed. In some implementations, the statement management device may obtain information to enable the statement management device to access the one or more databases, such as permission information and/or security information, among other examples.

As shown by reference number 110, the statement management device may parse the SQL statement to identify one or more CTE queries included in the SQL statement. For example, the statement management device may parse a relational statement (e.g., the SQL statement) to identify one or more temporary queries (e.g., one or more CTE queries) included in the relational statement. The statement management device may identify the one or more CTE queries included in the SQL statement.

For example, the statement management device may search the SQL statement for indicators of a start and/or an end of a CTE query. For example, a temporary query (e.g., a CTE query) may use a format or a common command to start or initiate the temporary query. In other words, a syntax associated with starting and/or ending a CTE query may be common for all CTE queries. As an example, a syntax associated with a start of a CTE query may include a command or clause associated with naming a sub-query and/or for defining a temporary relation such that the output of the temporary relation is available and/or is used by the SQL statement (e.g., a WITH clause or an SQL WITH clause). The WITH clause may include a name or identifier of the CTE. The WITH clause may include a keyword associated with defining the CTE (e.g., in SQL the keyword may be "AS"). Following the keyword, the WITH clause may include a query expression defining the CTE (e.g., in parenthesis). An indication of a CTE query may be indicated by the SQL statement including a WITH clause defining the CTE directly before another SQL command, such as a SELECT command, an INSERT command, an UPDATE command, a DELETE command, or a MERGE command, among other examples that references or uses the CTE.

In some implementations, the statement management device may search the SQL statement for a command or clause associated with naming a sub-query (e.g., a WITH clause) followed by a CTE keyword (e.g., AS). The CTE query may be defined using the WITH clause and the AS keyword. The CTE query may include one or more SQL statements or commands following the definition of the CTE (e.g., where the one or more SQL statements or commands reference a row or column of a table created by the definition of the CTE). The statement management device may identify an end of the CTE query based on identifying an indicator of an end of the one or more SQL statements or commands following the definition of the CTE (e.g., identified by the closing of a parenthesis or a semi-colon).

As shown by reference number 115, the statement management device may insert one or more indicators into the SQL statement for each CTE query (e.g., that is detected or identified by the statement management device). The indicators may be referred to as segment indicators or CTE indicators. The indicators may be triggers associated with determining one or more execution performance parameters while the SQL statement is being executed. For example, an indicator may trigger the statement management device to determine one or more performance parameters for a CTE query while executing the SQL statement. In other words, because a result of a CTE query may be deleted after execution of the SQL statement, an indicator may enable the statement management device to identify when, in the process of executing the SQL statement, a CTE query is being executed. This may enable the statement management device to determine the one or more performance parameters for the CTE query while executing the SQL statement (e.g., before the results of the CTE query are deleted or removed).

For example, the statement management device may segment or partition the SQL statement into one or more segments. The one or more segments may be associated with respective CTE queries from the one or more CTE queries included in the SQL statement. The statement management device may segment or partition the SQL statement may inserting and/or storing segment indicators for respective segments. A segment may start at an initiation of a CTE query (e.g., at a start of a WITH clause) and may end at an end of a CTE query (e.g., at an end of an SQL statement or command that references the temporary table created by the CTE query).

The statement management device may determine segment indicators associated with the respective segments from the one or more segments. The statement management device may store, in connection with the SQL statement, an indication of the segment indicators for identification of the one or more segments during the execution of the SQL statement. In some implementations, the statement management device may modify the SQL statement to include the segment indicators for respective segments of the SQL statement associated with respective CTE queries. In other implementations, the statement management device may store the one or more segment indicators in a file associated with executing the SQL statement (e.g., a configuration file or an SQL file). The file may be configured to indicate, to the statement management device, where or when a given segment occurs (e.g., associated with a CTE query) in the process of executing the SQL statement.

As shown in FIG. 1B, and by reference number 120, the statement management device may execute the SQL statement. For example, the statement management device may execute the SQL statement that includes the one or more segment identifiers and/or execute the SQL statement in association with executing a file that includes the one or more segment identifiers. As described elsewhere herein, the entire SQL statement may be executed by the statement management device in a single pass (e.g., executing the entire SQL statement without breaks or stops), such as in a "one shot" manner. For example, the statement management device may execute the SQL statement to perform the one or more CTE queries.

In some implementations, the statement management device may access a relational database associated with the SQL statement in connection with executing the SQL statement. For example, the statement management device may communicate with a device that stores the relational database to access the relational database (e.g., based on information provided by the client device as described in connection with FIG. 1A). In other examples, the statement management device may use a synthetic database that mimics or replicates the relational database associated with the SQL statement (e.g., rather than using the actual relational database).

As shown by reference number 125, the statement management device may determine, based on the one or more indicators (e.g., the one or more segment indicators), one or more performance parameters for each CTE query included in the SQL statement. The one or more performance parameters may also be referred to as execution performance parameters herein. The one or more performance parameters may indicate performance levels and/or performance information for respective CTE queries included in the SQL statement. In some implementations, one or more performance parameters for a given CTE query may be included in a log for the given CTE query. For example, the one or more performance parameters may be included in log information for respective CTE queries included in the SQL statement. The one or more performance parameters may include an execution time parameter (e.g., indicating an amount of time associated with executing a given CTE query), a record quantity parameter (e.g., indicating a quantity of records generated by a CTE query), a recursive CTE parameter (e.g., indicating a quantity of recursions (or repeated executions) that are performed for a given CTE query), a CTE table structure parameter (e.g., indicating metadata for temporary table(s) generated by a CTE query, such as a quantity of temporary tables, a data structure or schema of the temporary table(s), a quantity of columns, and/or other metadata), and/or a CTE table usage parameter (e.g., indicating references from other portions of the SQL statement that reference back to an element of a temporary table generated by a given CTE query), among other examples.

The statement management device may determine, for a given CTE query, the one or more performance parameters based on identifying one or more segment indicators associated with the given CTE query. For example, in the process of executing the SQL statement, the statement management device may determine a first one or more performance parameters associated with a first segment, from the one or more segments, corresponding to a first CTE query (e.g., by analyzing a performance of the SQL statement while executing the first segment of the SQL statement). Similarly, the statement management device may determine a second one or more performance parameters associated with a second segment, from the one or more segments, corresponding to a second CTE query (e.g., by analyzing a performance of the SQL statement while executing the second segment of the SQL statement). The one or more performance parameters may include the first one or more performance parameters and the second one or more performance parameters. The statement management device may determine performance parameter(s) for other segments and/or other CTE queries included in the SQL statement in a similar manner (e.g., by analyzing a performance of the SQL statement while executing the other segments identified by other segment identifier(s)).

For example, as shown by reference number 130, the statement management device may determine an execution time for each CTE query. An execution time may indicate an amount of time taken to execute a given CTE query. For example, the statement management device may determine the execution time for a given CTE query based on an amount of time associated with executing a segment of the SQL statement that is associated with the CTE query.

As an example, the statement management device may detect or identify a first segment indicator that indicates a start of a segment that is associated with a given CTE query. The statement management device may initiate a timer in response to detecting the first segment indicator. The statement management device may detect or identify a second segment indicator that indicates an end of the segment that is associated with a given CTE query. The statement management device may stop the timer in response to detecting the second segment indicator. The amount of time indicated by the timer may be the execution time for the given CTE query. The execution time for the given CTE query may be indicated via an execution time parameter, as described elsewhere herein.

As another example, and as shown by reference number 135, the statement management device may determine a quantity of records associated with each CTE query. For example, the statement management device may identify, based on executing a segment associated with a given CTE query, a temporary table generated based on executing the segment. The statement management device may identify a quantity of records (or rows) associated with the temporary table. By detecting the segment (e.g., using the segment indicator(s) associated with the segment) of the SQL statement associated with the given CTE query, the statement management device may be enabled to analyze the temporary table(s) generated based on executing the CTE query before the temporary table(s) are deleted (e.g., when the SQL statement has been fully executed). The quantity of records generated based on executing a given CTE query may be indicated via a record quantity parameter.

As another example, and as shown by reference number 140, the statement management device may determine a table structure associated with each CTE query. For example, the statement management device may identify, based on executing a segment associated with a given CTE query, a temporary table generated based on executing the segment. The statement management device may determine information associated with the temporary table. For example, the statement management device may determine a schema associated with the temporary table. As another example, the statement management device may determine a quantity of columns included in the temporary table. As another example, the statement management device may determine a size associated with the temporary table. Additionally, the statement management device may determine a quantity of temporary tables generated based on executing the segment of the SQL statement (e.g., a quantity of temporary tables generated based on executing the CTE query). The information associated with the temporary table(s) generated based on executing the CTE query may be indicated via one or more CTE table structure parameters.

As another example, as shown by reference number 145, the statement management device may determine usage information for a table (a temporary table) associated with each CTE query. The usage information may indicate references back to the temporary table in other portions of the SQL statement. For example, the usage information may indicate, for a given temporary table, a quantity of times each column of the temporary table is later referred to or referenced by other portion(s) of the SQL statement. In some implementations, the usage information may indicate one or more columns of the temporary table that are not referenced or referred by other portion(s) of the SQL statement. For example, the statement management device may identify one or more unused columns of a temporary table. In some implementations, the statement management device may determine a quantity of references, in the SQL statement, made to respective columns of the temporary table. The quantity of references may be included in the usage information. The usage information may be indicated via one or more CTE table usage parameter. The statement management device may determine usage information for each temporary table generated by the one or more CTE queries included in the SQL statement in a similar manner.

In some implementations, the statement management device may compare two or more (or all) temporary tables generated by the one or more CTE queries included in the SQL statement. For example, the statement management device may determine differences between each CTE (e.g., each temporary table) included in the SQL statement. As another example, the statement management device may determine one or more temporary tables that indicate the same (or similar information). For example, the statement management device may identify two or more temporary tables that indicate duplicated information.

The statement management device may store one or more performance parameters for respective CTE queries in a CTE database. The CTE database may be a log for the CTE queries included in the SQL statement. For example, the statement management device may maintain a log for each CTE query included in the SQL statement. The statement management device may include one or more performance parameters for a given CTE query in a log associated with the given CTE query. The statement management device may update the CTE database (e.g., logs for respective CTE queries) while executing the SQL statement.

As shown in FIG. 1C, and by reference number 150, the statement management device may detect one or more CTE queries that are associated with execution performance issues. An execution performance issue may refer to an issue (e.g., a delay or an error) associated with the statement management device caused by the execution of the segment of the SQL statement corresponding to a CTE query. The statement management device may detect the one or more CTE queries based on the performance parameters determined by the statement management device.

For example, the statement management device may detect that a CTE query is associated with an execution performance issue based on an execution time (e.g., indicated by an execution time parameter) for the CTE query satisfying a time threshold (e.g., indicating that the CTE query take a long time to execute which may be indicative of an execution performance issue). As another example, the statement management device may detect that a CTE query is associated with an execution performance issue based on the CTE query causing a temporary table to be generated that includes a quantity of records (e.g., indicated by a record quantity parameter) that satisfies a record threshold. For example, if a temporary table associated with the CTE query includes a large quantity of records, this may be indicative of an execution performance issue because of the processing resources associated with the statement management device generating, maintaining, and/or parsing the large quantity of records. As another example, the statement management device may compare the quantity of records to an expected quantity of records. The expected quantity of records may be based on the relational database that is associated with the SQL statement (e.g., the expected quantity of records may be a portion of the quantity of records included in the relational database).

As another example, the statement management device may detect that a CTE query is associated with an execution performance issue based on a quantity of recursions associated with a CTE query satisfying a recursion threshold. For example, a recursive CTE query may be a CTE query that references itself and stops when the CTE query returns all the results indicated by the definition of the CTE query. If the CTE query is associated with a large quantity of recursions, then the large quantity of recursions may be indicative of an execution performance issue because of the processing resources associated with the statement management device generating, maintaining, and/or parsing the large quantity of recursions.

As another example, the statement management device may detect that a CTE query is associated with an execution performance issue based on usage information of the CTE query indicating that one or more columns of a temporary table (e.g., that is generated based on executing the CTE query) are unused (e.g., are not referenced or referred to in any other portions of the SQL statement). For example, an unused column may needlessly consume processing resources associated with the statement management device generating the column in the temporary table. As another example, the statement management device may detect that a CTE query is associated with an execution performance issue based on a data structure or schema of a temporary table (e.g., that is generated based on executing the CTE query). For example, the statement management device may compare the data structure or schema to an expected data structure or schema (e.g., that is based on the relational database associated with the SQL statement and/or other portions of the SQL statement). If the data structure or schema does not match or follow the expected data structure or schema, then the statement management device may detect that the CTE query is associated with an execution performance issue.

As another example, the statement management device may detect that a CTE query is associated with an execution performance issue based on information included in a temporary table (e.g., that is generated based on executing the CTE query) being duplicated by another temporary table (e.g., that is generated based on executing the CTE query or another CTE query). For example, duplicated information may needlessly consume processing resources associated with the statement management device generating the temporary table that includes the duplicated information.

As shown by reference number 155, the statement management device may determine one or more recommended actions to mitigate the detected execution performance issues. For example, a recommended action may be to investigate an SQL syntax of a CTE query that is associated with an execution performance issue. For example, the statement management device may include a flag or other indicator associated with the one or more CTE queries that are detected to be associated with execution performance issue(s). The flag or other indicator may indicate, to a user, to investigate the associated CTE query in the SQL statement. As another example, a recommended action may be to remove or delete a column of a temporary table associated with a CTE query that is unused. For example, the statement management device may generate an indicator that the CTE query should be modified to not cause the unused column to be generated.

In some implementations, the statement management device may determine, based on a SQL syntax of a CTE query, one or more recommended actions to mitigate the execution performance issue. For example, the statement management device may analyze the SQL syntax to identify one or more clauses, commands, or instructions that are causing the execution performance issue associated with the CTE query. For example, the statement management device may determine that a portion of the CTE query (e.g., WITH clause, a CTE keyword, and/or another SQL command or statement) is not correctly formatted (e.g., based on the SQL syntax of the CTE query). The one or more recommended actions may be to investigate and/or modify the portion of the CTE query.

In some implementations, the statement management device may perform one or more actions based on detecting the one or more CTE queries that are associated with execution performance issues. In some implementations, the one or more actions may be to determine the one or more recommended actions (e.g., as described above). Additionally, or alternatively, the one or more actions may be to automatically perform the one or more recommended actions. For example, the statement management device may modify a syntax of a CTE query based on the one or more recommended actions (e.g., to cause the one or more recommended actions to be performed when the CTE query is executed).

As shown by reference number 160, the statement management device may provide or transmit, and the client device may obtain or receive, a CTE query performance report for the SQL statement. For example, the CTE query performance report may include an indication of the CTE database and/or logs associated with respective CTE queries included in the SQL statement. Additionally, or alternatively, the CTE query performance report may indicate one or more performance parameters for respective CTE queries included in the SQL statement. Additionally, or alternatively, the CTE query performance report may indicate the one or more recommended actions. For example, the statement management device may provide, to the client device, an indication that a CTE query is associated with the execution performance issue. Additionally, or alternatively, the CTE query performance report may indicate the actions automatically performed by the statement management device.

As a result, performance issues for a device (e.g., the statement management device and/or the client device) associated with executing the SQL statement that are caused by one or more CTE queries may be easily mitigated. For example, by including identifiers in the SQL statement (or a file that includes the SQL statement) that identify locations, in the SQL statement, associated with respective CTE queries, the statement management device may be enabled to identify performance parameters for each CTE query during the "one shot" execution of the SQL statement. Providing the performance parameters associated with respective CTE queries in an SQL statement enables the statement management device (and/or a user) to identify and/or modify CTE queries that are causing performance issues associated with executing the SQL statement. As a result, the statement management device may be enabled to execute an SQL statement that includes CTE queries that have been modified to mitigate one or more performance issues, thereby conserving computing resources, processing resources, and/or power resources, among other examples, that would have otherwise been used to execute the SQL statement that results in the one or more performance issues, and/or to identify the CTE queries that are causing the one or more performance issues, among other examples.

As indicated above, FIGS. 1A-1C are provided as an example. Other examples may differ from what is described with regard to FIGS. 1A-1C.

Figure 2:
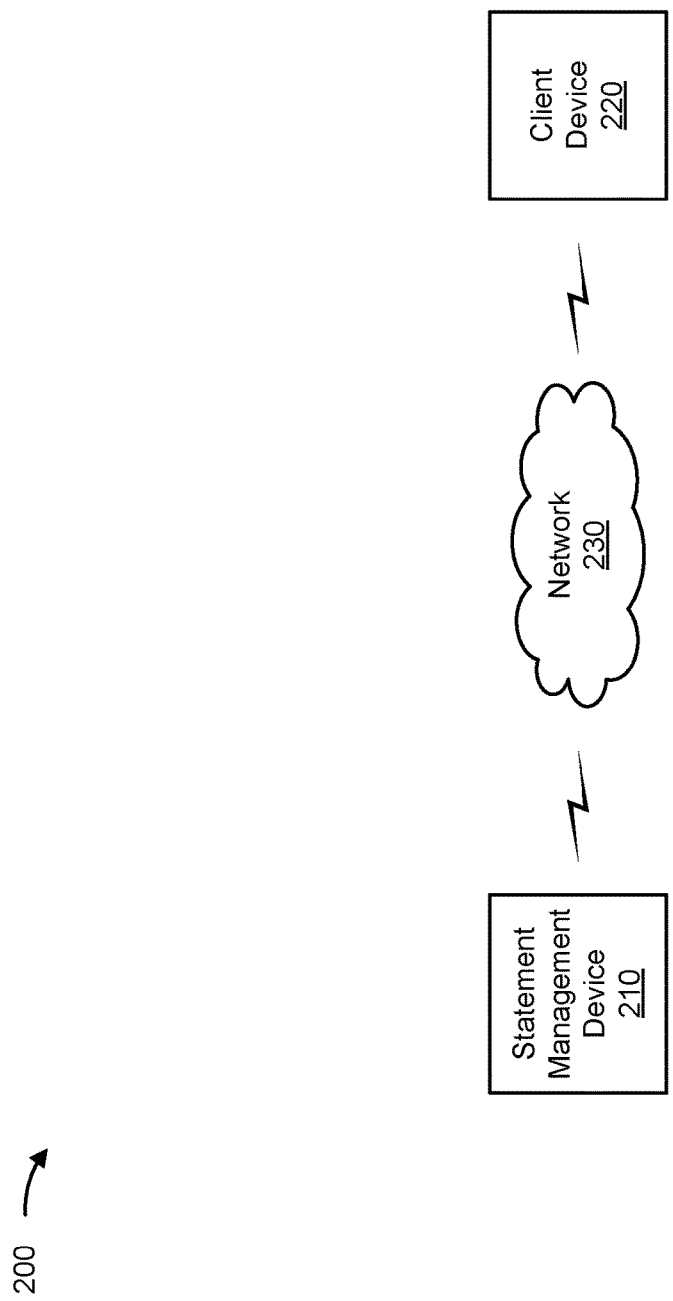
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a statement management device 210, a client device 220, and a network 230. Devices of environment 200 may interconnect via wired connections, wireless connections, or a combination of wired and wireless connections.

The statement management device 210 may include one or more devices capable of receiving, generating, storing, processing, providing, and/or routing information associated with analysis of temporary queries (e.g., CTE queries) in a relational statement (e.g., an SQL statement), as described elsewhere herein. The statement management device 210 may include a communication device and/or a computing device. For example, the statement management device 210 may include a server, such as an application server, a client server, a web server, a database server, a host server, a proxy server, a virtual server (e.g., executing on computing hardware), or a server in a cloud computing system. In some implementations, the statement management device 210 may include computing hardware used in a cloud computing environment.

The client device 220 may include one or more devices capable of receiving, generating, storing, processing, and/or providing information associated with analysis of temporary queries (e.g., CTE queries) in a relational statement (e.g., an SQL statement), as described elsewhere herein. The client device 220 may include a communication device and/or a computing device. For example, the client device 220 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 230 may include one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
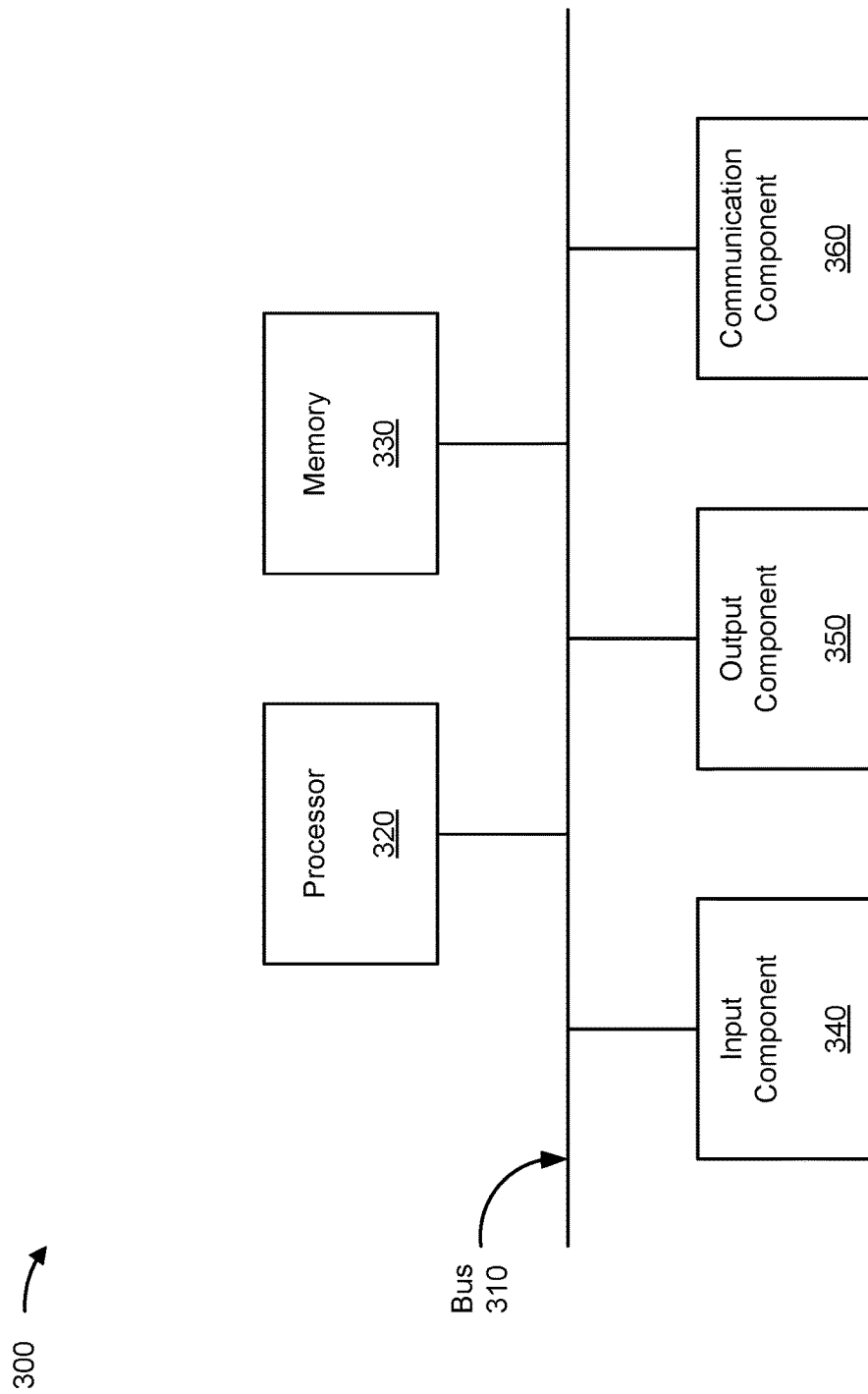
FIG. 3 is a diagram of example components of a device associated with analysis of temporary queries in a relational statement, in accordance with some embodiments of the present disclosure.

FIG. 3 is a diagram of example components of a device 300 associated with analysis of temporary queries in a relational statement. The device 300 may correspond to the statement management device 210 and/or the client device 220. In some implementations, the statement management device 210 and/or the client device 220 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
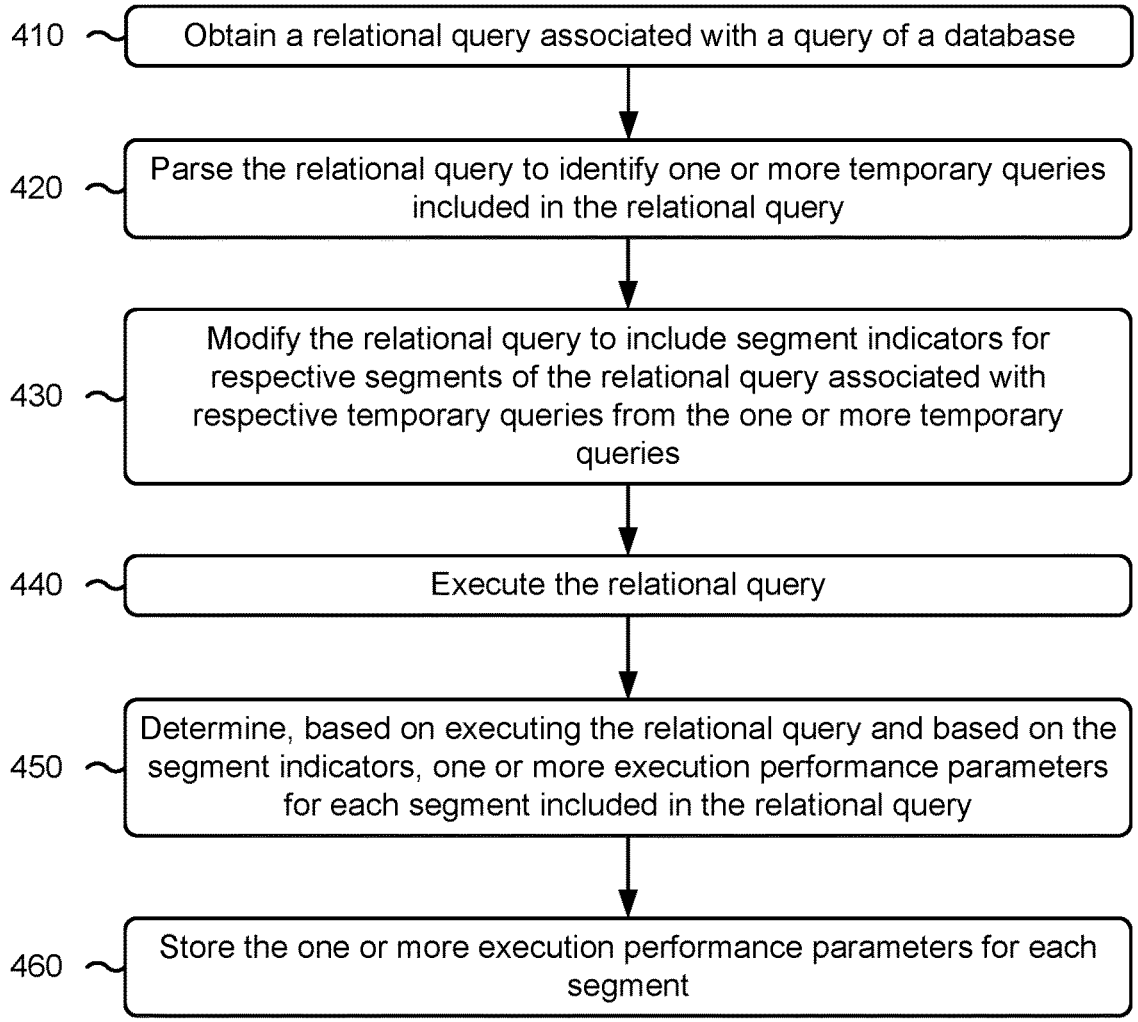
FIG. 4 is a flowchart of an example process associated with analysis of temporary queries in a relational statement, in accordance with some embodiments of the present disclosure.

FIG. 4 is a flowchart of an example process 400 associated with analysis of temporary queries in a relational statement. In some implementations, one or more process blocks of FIG. 4 may be performed by the statement management device 210. In some implementations, one or more process blocks of FIG. 4 may be performed by another device or a group of devices separate from or including the statement management device 210, such as the client device 220. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining the relational statement associated with a query of a database (block 410). For example, the statement management device 210 (e.g., using processor 320 and/or memory 330) may obtain the relational statement associated with a query of a database, as described above in connection with reference number 105 of FIG. 1A. As an example, the statement management device 210 may obtain an SQL statement that includes one or more CTE queries.

As further shown in FIG. 4, process 400 may include parsing the relational statement to identify one or more temporary queries included in the relational statement (block 420). For example, the statement management device 210 (e.g., using processor 320 and/or memory 330) may parse the relational statement to identify one or more temporary queries included in the relational statement, as described above in connection with reference number 110 of FIG. 1A. As an example, the statement management device 210 may search the relational statement (e.g., the SQL statement) for syntax or identifiers that indicate a start and/or an end of a temporary query (e.g., a CTE query).

As further shown in FIG. 4, process 400 may include modifying the relational statement to include segment indicators for respective segments of the relational statement associated with respective temporary queries from the one or more temporary queries (block 430). For example, the statement management device 210 (e.g., using processor 320 and/or memory 330) may modify the relational statement to include segment indicators for respective segments of the relational statement associated with respective temporary queries from the one or more temporary queries, as described above in connection with reference number 115 of FIG. 1A. As an example, the statement management device 210 may store the segment indicators for respective segments in connection with the relational query (e.g., the SQL query). A segment may be associated with a portion of the SQL query that includes a CTE query.

As further shown in FIG. 4, process 400 may include executing the relational statement (block 440). For example, the statement management device 210 (e.g., using processor 320 and/or memory 330) may execute the relational statement, as described above in connection with reference number 120 of FIG. 1B. As an example, the statement management device 210 may execute the relational statement (e.g., the SQL statement) and monitor for the one or more segment indicators. A segment indicator may be a trigger to cause the statement management device 210 to track performance parameters for a given CTE query that is associated with a segment of the SQL statement.

As further shown in FIG. 4, process 400 may include determining, based on executing the relational statement and based on the segment indicators, one or more execution performance parameters for each segment included in the relational statement (block 450). For example, the statement management device 210 (e.g., using processor 320 and/or memory 330) may determine, based on executing the relational statement and based on the segment indicators, one or more execution performance parameters for each segment included in the relational statement, as described above in connection with reference number 125, reference number 130, reference number 135, reference number 140, and/or reference number 145 of FIG. 1B. As an example, the one or more execution performance parameters indicate performance levels of the one or more temporary queries.

As further shown in FIG. 4, process 400 may include storing the one or more execution performance parameters for each segment (block 460). For example, the statement management device 210 (e.g., using processor 320 and/or memory 330) may store the one or more execution performance parameters for each segment, as described above in connection with FIG. 1C. As an example, the statement management device 210 may store the one or more execution performance parameters in a database and/or in one or more logs. The statement management device 210 may perform an action based on the one or more execution performance parameters, as described in more detail elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for analysis of temporary queries in a relational statement, the system comprising:
   one or more memories; and
   one or more processors, communicatively coupled to the one or more memories, configured to:
      obtain a structured query language (SQL) statement associated with one or more operations associated with a database;
      identify one or more common table expression (CTE) queries included in the SQL statement,
         wherein the one or more CTE queries are associated with temporary query results that exist for a duration of an execution of the SQL statement;
      modify the SQL statement to include segment indicators for respective segments of the SQL statement associated with respective CTE queries from the one or more CTE queries;
      execute the SQL statement to perform the one or more CTE queries;
      determine, during the execution of the SQL statement and based on the segment indicators, one or more execution performance parameters for each segment included in the SQL statement, wherein the one or more execution performance parameters indicate performance levels of the one or more CTE queries;
      generate, based on the determined one or more execution performance parameters, a CTE database indicating the determined one or more execution performance parameters for the each segment; and
      provide, to a device, the CTE database.

2. The system of claim 1, wherein the one or more processors are further configured to:
   determine the segment indicators for the respective segments of the SQL statement; and
   store, in connection with the SQL statement, an indication of the segment indicators for identification of the one or more segments during the execution of the SQL statement.

3. The system of claim 1, wherein the one or more processors are further configured to:
   determine, based on the one or more execution performance parameters, that a CTE query, from the one or more CTE queries, is associated with an execution performance issue; and
   perform an action associated with the CTE query based on determining that the CTE query is associated with the execution performance issue.

4. The system of claim 3, wherein the one or more processors, to perform the action, are configured to:
   provide, to the device, an indication that the CTE query is associated with the execution performance issue.

5. The system of claim 3, wherein the one or more processors, to perform the action, are configured to:
   analyze an SQL syntax of the CTE query;
   identify, based on analyzing the SQL syntax, one or more SQL statements included in the CTE query that are associated with causing the execution performance issue; and provide, to the device, an indication of the one or more SQL statements.

6. The system of claim 3, wherein the one or more processors, to perform the action, are configured to:

determine, based on a SQL syntax of the CTE query, one or more recommended actions to mitigate the execution performance issue; and provide, to the device, an indication of the one or more recommended actions.

7. The system of claim 1, wherein the one or more CTE queries include a first CTE query and a second CTE query, and wherein the one or more processors, to execute the SQL statement, are configured to:

determine, based on executing the SQL statement, a first one or more execution performance parameters associated with a first segment, from the respective segments, corresponding to the first CTE query; and determine, based on executing the SQL statement, a second one or more execution performance parameters associated with a second segment, from the respective segments, corresponding to the second CTE query, wherein the one or more execution performance parameters include the first one or more execution performance parameters and the second one or more execution performance parameters.

8. The system of claim 1, wherein the one or more execution performance parameters include at least one of:

an execution time parameter, a record quantity parameter, a recursive CTE parameter, a CTE table structure parameter, or a CTE table usage parameter.

9. A method of analysis of temporary queries in a relational statement, comprising:

obtaining, by a device, the relational statement associated with a query of a database, the relational statement being a structured query language (SQL) statement;

parsing, by the device, the relational statement to identify one or more temporary queries included in the relational statement, wherein the one or more temporary queries are common table expression (CTE) queries associated with temporary query results that exist for a duration of an execution of the relational statement;

modifying, by the device, the relational statement to include segment indicators for respective segments of the relational statement associated with respective temporary queries from the one or more temporary queries;

executing, by the device, the relational statement to perform the one or more CTE queries;

determining, by the device and during the execution of the relational statement and based on the segment indicators, one or more execution performance parameters for each segment included in the relational statement, wherein the one or more execution performance parameters indicate performance levels of the one or more temporary queries; and generating, by the device based on the determined one or more execution performance parameters for the each segment, a CTE database indicating the determined one or more execution performance parameters for the each segment.

10. The method of claim 9, wherein the segment indicators are triggers associated with the determined one or more execution performance parameters.

11. The method of claim 9, wherein the determining of the one or more execution performance parameters comprises:

detecting, in association with executing the relational statement, a first segment indicator associated with a first temporary query of the one or more temporary queries; and determining, based on the detected first segment indicator and in association with executing a first portion of the relational statement associated with the first temporary query, a first one or more execution performance parameters associated with the first temporary query.

12. The method of claim 11, wherein the determining of the one or more execution performance parameters comprises:

detecting, in association with executing the relational statement, a second segment indicator associated with a second temporary query of the one or more temporary queries; and determining, based on the detected second segment indicator and in association with executing a second portion of the relational statement associated with the second temporary query, a second one or more execution performance parameters associated with the second temporary query.

13. The method of claim 9, wherein the determining of the one or more execution performance parameters comprises:

determining, in association with executing the relational statement and based on the segment indicators, an amount of time associated with executing each temporary query of the one or more temporary queries.

14. The method of claim 9, wherein the determining of the one or more execution performance parameters comprises:

identifying a temporary table that is created as part of a temporary query of the one or more temporary queries; and determining a quantity of references, in the relational statement, made to respective columns of the temporary query, wherein an execution performance parameter, of the one or more execution performance parameters, includes the quantity of references.

15. The method of claim 9, further comprising:

transmitting, to another device, one or more recommended actions associated with a syntax of the relational statement, wherein the one or more recommended actions are based on the one or more execution performance parameters.

16. A non-transitory computer-readable medium storing a set of instructions, the set of instructions comprising:

one or more instructions that, when executed by one or more processors of a device, cause the device to:

obtain a structured query language (SQL) statement associated with a query of a database;

identify one or more common table expression (CTE) queries included in the SQL statement, wherein the one or more CTE queries are associated with temporary query results that exist for a duration of an execution of the SQL statement;

modify the SQL statement to include segment indicators for respective segments of the SQL statement associated with respective CTE queries from the one or more CTE queries;

execute the SQL statement to perform the one or more CTE queries;

determine, during the execution of the SQL statement and based on the segment indicators, one or more execution performance parameters for each segment included in the SQL statement, wherein the one or more execution performance parameters indicate performance levels of the one or more CTE queries; and generate, based on the determined one or more execution performance parameters, a CTE database indicating the determined one or more execution performance parameters for the each segment.

17. The non-transitory computer-readable medium of claim 16, wherein the one or more instructions further cause the device to:

determine the segment indicators for the respective segments of the SQL statement; and store, in connection with the SQL statement, an indication of the segment indicators for identification of the respective segments during the execution of the SQL statement.

18. The non-transitory computer-readable medium of claim 16, wherein the one or more instructions further cause the device to:

determine, based on the one or more execution performance parameters, that a CTE query, from the one or more CTE queries, is associated with an execution performance issue; and perform an action associated with the CTE query based on determining that the CTE query is associated with the execution performance issue.

19. The non-transitory computer-readable medium of claim 16, wherein the one or more CTE queries include a first CTE query and a second CTE query, and wherein the set of instructions, that cause the device to determine the one or more execution performance parameters, cause the device to:

determine, in association with executing the SQL statement, a first one or more performance parameters associated with a first segment, from the respective segments, corresponding to the first CTE query; and determine, in association with executing the SQL statement, a second one or more performance parameters associated with a second segment, from the respective segments, corresponding to the second CTE query, wherein the one or more execution performance parameters include the first one or more performance parameters and the second one or more performance parameters.

* * * * *